3,176,037
REMOVAL OF METAL CONTAMINANTS FROM POLYMER SOLUTIONS
Paul F. Warner, Phillips, Tex., assignor to Phillips Petroleum Company, a corporation of Delaware
No Drawing. Filed Jan. 23, 1961, Ser. No. 83,867
10 Claims. (Cl. 260—475)

This invention relates to polymerization and to the removal of metal contaminants or impurities in polymerization processes. In accordance with one aspect, this invention relates to an improved process for the removal of alkali metal impurities present in polymeric products.

The art is well familiar with the preparation and uses of a wide variety of polymeric products. Many of these polymeric products are prepared employing metal compounds as catalyst in the polymerization reaction. In the alkali metal polymerization of vinylidene-containing monomers, e.g., conjugated dienes and the like, it is necessary to treat the resulting reaction mixture in some manner to convert the alkali metal and reactive alkali metal organic compounds present to prevent further catalytic effect of the alkali metal on the product. Alkali metal catalysts are harmful if left in the product because they promote cross-linking of the polymer with concomitant formation of gel. A polymer which is to be used as a drying oil should not contain any substantial amount of alkali metal or alkali metal compounds as these tend to render the liquid cloudy and cause undesirable reactions when compounding these oils in paints, various types of varnishes and protective surface coatings and adhesive formulations.

According to prior art processes, it has been common to treat the polymer with an alcohol to deactivate the catalyst and then follow this treatment with a water washing step. Such water washing produces a substantially catalyst-free product but, in some cases, leads to the formation of emulsions which reduce the ultimate yield of product. Furthermore, the presence of even trace amounts of water is deleterious to filtration rates and to ash content of the finished polymer.

The present invention is directed to an improved process for recovering a substantially catalyst free product, either as a solution of the polymer in an organic solvent or as a liquid polymer free of solvent wherein these prior art problems are obviated.

Accordingly, an object of this invention is to provide an improved process for preparing polymers in the presence of alkali metal catalysts that are substantially free of said catalyst in the product.

Another object of this invention is to provide an improved process for removing alkali metal impurities from polymeric products.

A further object of this invention is to provide an improved process for the removal of alkali metal impurities from homopolymers of conjugated dienes and copolymers of conjugated dienes.

Other objects, aspects as well as the several advantages of this invention will be apparent to one skilled in the art upon reading this disclosure and the appended claims.

In accordance with the present invention, I provide a process for treating solutions of polymeric products produced by polymerizing vinylidene-containing monomers in the presence of an alkali metal-containing catalyst and which contains alkali metal as an impurity, which comprises intimately contacting an organic solution of said polymeric product with the acid form of a cation exchange resin for a sufficient time to remove substantially all of said impurity from said solution. The present invention is directed to treatment of the polymers commonly, the process being practiced on the reaction zone effluent, by a process which does not involve the use of water.

The present invention can be used to remove an alkali metal from any polymer solution which is inert with respect to the ion exchange resin under the conditions of treatment. The present invention has particular application to hydrocarbon solutions of polymers produced by the catalytic action of an alkali metal-containing catalyst upon polymerizable vinylidene-containing monomers. The present invention applies particularly to the treatment of hydrocarbon solutions of polymers made by polymerizing conjugated dienes containing from 4 to 12 carbon atoms and preferably 4 to 8 carbon atoms in solution in the presence of alkali metal-containing catalysts. These polymers include homopolymers as well as copolymers and terpolymers or block polymers of these conjugated dienes. Representative conjugated dienes include 1,3-butadiene, isoprene, piperylene, 2-methyl-1,3 - pentadiene, 2,3 - dimethyl-1,3-butadiene, 2-methyl-1,3-hexadiene, 1,3-octadiene and the like. Minor amounts of various comonomers can be used in combination with the conjugated diene including, for example, styrene, various alkyl styrenes, vinyl chloride, acrylonitrile, methylvinyl ether, heterocyclic nitrogen bases of the pyridine and quinoline series, the alkyl acrylates containing from 4 to 8 carbon atoms in the alkyl group, and the like. A group of terpolymers of current interest are those prepared by polymerizing a major amount of a conjugated diene, as above defined, with small amounts of an alkyl acrylate and a styrene hydrocarbon. The above compounds in addition to being polymerizable alone are also copolymerizable with each other and can be copolymerized to form terminally reactive polymers.

By the term "alkali metal impurities," employed herein, it is meant to include free alkali metal and/or organo alkali metal compounds formed during the polymerization and present in the polymer product, and also organo alkali metal compounds employed as catalysts, such as n-butylsodium, sodium triphenylmethyl, n-butyllithium, alkali metal hydrides, and the like. These latter compounds are exemplary of catalysts within the group consisting of the alkali metals, the alkali metal hydrides, the alkali metal alkyls, the alkali metal aryls, and the like. The organic radical of the organo alkali metal compound can be an aliphatic, cycloaliphatic or aromatic radical. Any of the above-mentioned type materials, i.e., free alkali metals such as sodium, potassium or lithium and/or the defined organo alkali metal compounds, when present in the polymer product comprise the said "alkali metal impurities" removed from the polymer in accordance with this invention.

Generally an inert liquid organic diluent will be employed in the polymerization process to facilitate the polymerization reaction. The amount of inert diluent employed in the polymerization process should be such that the final polymeric product in the reaction mixture is a relatively fluid mixture. Preferably, the polymer concentration in the solution processed according to this invention is about 8 to 12 weight percent. The inert liquid organic diluents employed in the preparation of the catalyst as well as in the polymerization reaction itself are preferably hydrocarbons, e.g. paraffins, cycloparaffins, and aromatics containing from 4 to 10 carbon atoms per molecule. Suitable solvents or diluents include benzene, toluene, cyclohexane, methylcyclohexane, xylene, n-butane, n-hexane, n-heptane, isooctane, and the like.

The polymerization reaction conditions employed, i.e. time, temperature and pressure will vary appreciably depending upon the particular monomers being polymerized, the catalyst employed as well as the type of polymeric product desired. These conditions are all well known in the art and form no part of the present invention. However, in general, the polymerization temperature employed will range from about −100° F. to about 300° F. and the pressure will usually be sufficient to maintain liquid-phase conditions.

As indicated above, upon completion of the polymerization reaction, the reaction mixture removed from the polymerization zone, either with or without intermediate separation, is treated in accordance with the invention by contacting the polymeric product solution with a cation exchange resin, as set forth below, to remove alkali metal impurities present in the polymer solution. The ion exchange resins employed in the present invention are cation exchange resins which are in the acid form. After treatment with the ion exchange resin, the solvent can be separated from the polymer solution by any convenient method, such as fractionation, etc.

The present invention is particularly advantageously carried out using sulfonated (or phosphonated) polystyrene resins and especially sulfonated polystyrene resins which contain as constituent monomers styrene and divinylbenzene. The polystyrene resin is generally prepared by polymerizing monomers comprising about 50 to 99 weight percent of styrene and about 1 to 50 weight percent of divinylbenzene. Such ion exchange resins are well known in the art and are marketed commercially and are particularly useful in the present invention. It will be understood, however, that the present invention is also applicable to other ion exchange resins.

Other sulfonated polystyrene ion exchange resins that can be used are sold by the Rohm and Haas Company under the "Amberlite" trademark, particularly "Amberlite–IR–120." Other particularly useful resins for the purpose of the present invention are the commercial cation-exchange resins known under the trade name "Dowex," especially Dowex 50×10 and 50×12 resins. All of the sulfonic acid type ion exchange resins are usually sold in the form of sodium salts which can be readily converted or regenerated to the acid type by washing with an aqueous solution of sulfuric or hydrochloric acid in any manner well known by itself. A particularly useful resin for purpose of the present invention is a commercial cation exchange resin known under the trade name Nalco HGR made by the National Aluminum Corporation. This is a sulfonated resinous copolymer of about 90 percent styrene and 10 percent divinylbenzene, which contains about 12 to 16 percent sulfur in the sulfonate form, based on the anhydrous resin. It will be understood, of course, that the described polystyrene type ion exchange resins as well as their preparation are well known and readily available as commercial products.

In the preferred contacting operation, the liquid polymer solution is passed through a bed of the ion exchange resin. However, it will be understood that other contacting techniques can be employed such as, for example, mixing the ion exchange resin in particle form with the liquid polymer solution. Generally, the contacting operation will be carried out at a temperature from about atmospheric temperature to about 250° F. or higher. Usually it will be most convenient to carry out the contacting operation at about the same temperature as the polymer solution effluent removed from the polymerization zone, thereby avoiding additional heat exchange of the polymer solution.

The ion exchange resins are ordinarily rated according to their exchange capacity. In general, I prefer to use an excess, say from 10 to 20 percent, of the resin in order to remove substantially all of the alkali metal impurities present in the polymer solution. For best results, I prefer to pass the solution through a bed of the resin at a rate not exceeding about 1 volume of solution per volume of ion exchange resin per minute. This gives sufficient time for complete exchange. However, if the solution is run through faster, the product may still be acceptable, but I prefer to obtain the maximum removal of alkali metal impurities. Running the solution through the resin more slowly does not have any detrimental effect, but is not ordinarily necessary.

The ion exchange resins employed, as described above, for removing alkali metal contaminants from liquid polymer solutions can be regenerated by techniques well known in the art, for example, washing with a strong mineral acid. Preferably the ion exchange resins are generated by treatment with a halogen acid or sulfuric acid in a non-aqueous solvent. The preferred halogen acids are anhydrous HCl or HBr and the non-aqueous solvent is a hydrocarbon, such as heptane or benzene, or an alcohol, such as isopropyl alcohol, or a chlorinated solvent such as chloroform or carbon tetrachloride. Generally, the regeneration step is carried out at a temperature of about 60 to 280° F., preferably about room temperature. The regeneration can be carried out on either a batch basis or a continuous basis.

The present invention will be more fully understood by reference to the following examples. It should be pointed out, however, that the examples are given for the purpose of illustration only and are not to be construed as limiting the scope of the present invention in any way.

EXAMPLE I

A liquid terpolymer of 1,3-butadiene, styrene, and butylmethacrylate was prepared by polymerizing the monomers at a temperature of about 122° F. using finely divided sodium as a catalyst in an amount of approximately 1 weight percent based upon the monomers charged. A commercially available isoparaffinic hydrocarbon solvent (Soltrol–130) (approx. boiling range 350–405° F.) was used as the solvent in an amount to give an approximate 8–10 weight percent solution of the liquid polymer. The polymer was prepared by first reacting butadiene and styrene in the solvent to form a butadiene-styrene copolymer. When this reaction was complete, the butylmethacrylate was added to form the terpolymer. Following polymerization, in one run the reactor effluent was quenched with methanol and, in another run, the reactor effluent was first carbonated with $CO_2$ and then filtered.

Each reactor effluent, treated as described above, was then passed through a bed of an acid form ion exchange resin in a 21.5 mm. outside diameter by 32 inch long glass tube filled with 295 ml. of an acid treated resin. The ion exchange resin employed is manufactured by the National Aluminum Company and is sold under the trade name of Nalco HDR. The exchange resin was prepared for use by first passing 20 weight percent $H_2SO_4$ (80%) in isopropyl alcohol over the resin, followed by isopropyl alcohol to remove free acid.

This ion exchange resin is a sulfonated resin copolymer of about 88 percent styrene and about 12 percent divinylbenzene, which contains about 12–16 percent sulfur in the sulfonate form, based on total dry sulfonated resin.

The efficiency of sodium removal from the liquid terpolymer solution by contacting with the ion exchange resin is shown below.

*Table 1*

| Terpolymer Identification | Methanol Quenched Reactor Effluent | Carbonated and Filtered Reactor Effluent |
|---|---|---|
| Ash Content of Feed, wt. percent [1] | 2.95 | 0.105 |
| Feed Rate v./v./hr. | 0.7 to 1.6 | 1.4 |
| Ash Content [1] of Effluent at Volumes Over, wt. percent: | | |
| 1 | | 0.002 |
| 3 | 0.072 | |
| 7 | | 0.001 |
| 20 | 0.05 | 0.000 |

[1] Volatiles free basis.

Referring to the above table it can be seen that the ion exchange resin substantially reduced the ash content (metal content) of the polymer. Also, substantially all of the sodium used as catalyst was removed by the ion exchange resin from the methanol quenched reactor effluent. Further, only that sodium believed to be attached to carboxy groups was removed from the carbonated and filtered reactor effluent.

*Example II*

A liquid, linear polymer of 1,3-butadiene of about 6,000 molecular weight was prepared by polymerizing 1,3-butadiene at a temperature of 122° F. by contacting same with a lithium-methylnaphthalene-isoprene catalyst adduct in cyclohexane as the reaction medium. The reactor effluent contained about 8–10 weight percent butadiene polymer in the solution.

The recipe for preparing enough catalyst for 10 reactor batches of 450 pounds of polymer each is as follows:

|  | Pounds |
|---|---|
| Lithium | 27.8 |
| Methyl naphthalene | 190.0 |
| Isoprene | 91.8 |
| Diethyl ether | 445.0 |
| Butadiene | 290.0 |

After completion of the polymerization $CO_2$ is added to the reaction mixture to convert the lithium alkyl on each end of the polymer chain to lithium carboxylate.

The carbonated polymer in solution in cyclohexane was passed over a fixed bed of 295 ml. of a 50–50 weight mixture of Nalco HDR and HGR ion exchange resins in the same apparatus described in Example I. The ion exchange resin mixture was pretreated with $H_2OS_4$ and isopropyl alcohol as set forth in Example I. Nalco HGR (manufactured by National Aluminum Co.) is a sulfonated resin copolymer of about 90 percent styrene and 10 percent divinylbenzene, and contains from 12–16 percent sulfur in the sulfonate form. Nalco HDR properties are set forth in Example I.

The efficiency of lithium removal from the carbonated liquid polymer in solution in cyclohexane by contacting with the mixture of ion exchange resins is shown below.

*Table II*

| Volumes/Volume of Resin[1] | Ash. wt. percent [2] Carbonated |
|---|---|
| 0 (charge) | 4.01 |
| 3 | 0.414 |
| 10 | 1.30 |
| 16 | 3.19 |
| Regenerated with $H_2SO_4$ in Isopropyl Alcohol | |
| 3 (after regeneration) | 1.53 |

[1] Polymer content 8 weight percent.
[2] Based on solvent-free polymer.

Referring to the above table it can be seen that the ion exchange resin mixture substantially reduced the ash content (metal content) of the polymer. This is surprising since the problem of ash removal from the polymer of this example is considerably more difficult than in Example I in view of the fact that the ion exchange resin has a greater selectivity for sodium than lithium.

Although I have specifically described representative embodiments of the invention, it will be apparent to those skilled in the art that the invention is not limited to the specific examples given, but only as required by the spirit and scope of the appended claims.

I claim:

1. In a process for the treatment of a terpolymer produced by solution polymerization of 1,3-butadiene, styrene and butylmethacrylate in a hydrocarbon diluent in the presence of a metallic sodium catalyst and in which the resulting liquid terpolymer is carbonated with $CO_2$ to form a carboxylated polymer in solution which contains metallic sodium and sodium derivatives as impurities, the improvement which comprises passing said terpolymer in said solution in said hydrocarbon diluent through a bed of an acid regenerated ion exchange resin to remove said impurities, and recovering said terpolymer, substantially free of said impurities, as a product of the process.

2. A process according to claim 1 wherein said resin is an ion exchange sulfonated styrene-divinylbenzene copolymer resin in acid form.

3. An improved process for the preparation of a poly (1,3-butadiene) which comprises polymerizing 1,3-butadiene in the presence of an alkali metal polymerization catalyst and an inert non-aqueous hydrocarbon diluent, carbonating the resulting polymer with $CO_2$ to form a carboxylated polymer, recovering the resulting solution of carboxylated polymeric material containing alkali metal contaminants, passing said solution through a bed of a cation exchange resin in the acid form to remove said contaminants from said solution, and recovering said solution substantially free of said contaminants as a product of the process.

4. A process according to claim 3 wherein said alkali metal is sodium.

5. A process according to claim 3 wherein said alkali metal is lithium.

6. A process according to claim 3 wherein said resin is an ion exchange sulfonated styrene-divinylbenzene copolymer resin in acid form.

7. A process for the preparation of polymer of low ash content which comprises solution polymerizing a mixture of 1,3-butadiene, styrene and butyl methacrylate in the presence of a sodium containing catalyst to form a terpolymer, carbonating the resulting ter-polymer to form a sodium carboxylated ter-polymer, contacting a solution of said carboxylated polymer with the acid form of a cation exchange resin and recovering said polymer substantially free of sodium from said solution as a product of the process.

8. A process for the preparation of polymer of low ash content which comprises solution polymerizing butadiene in the presence of a lithium containing catalyst to form a butadiene polymer, carbonating the resulting polymer to form a lithium carboxylated polymer, contacting a solution of said carboxylated polymer with the acid form of a cation exchange resin and recovering said polymer substantially free of lithium from said solution as a product of the process.

9. A process for the preparation of a polymer of low ash content which comprises solution polymerizing a mixture of 1,3-butadiene, styrene and butylmethacrylate in the presence of a sodium containing catalyst to form a terpolymer, quenching the resulting ter-polymer solution with methanol, contacting said solution of said methanol quenched polymer with the acid form of a cation exchange resin, and recovering said polymer substantially free of sodium from said solution as the product of the process.

10. A process for the preparation of a polymer of low ash content produced by polymerizing a conjugated diene in the presence of an alkali metal catalyst in a hydrocarbon reaction diluent which comprises treating the polymer in said hydrocarbon solution with a reagent selected from the group consisting of alcohols and carbonating agents to terminate polymerization and introduce reactive groups in the polymer chain, and contacting the resulting polymer in solution with the acid form of a cation exchange resin to remove alkali metal catalyst contaminants from said polymer solution.

References Cited in the file of this patent

UNITED STATES PATENTS

| 2,340,111 | D'Alelio | Jan. 25, 1944 |
| 2,929,808 | Ross | Mar. 22, 1960 |
| 2,980,499 | Goodenough et al. | Apr. 18, 1961 |